United States Patent [19]

Kawakubo et al.

[11] Patent Number: 4,894,215
[45] Date of Patent: Jan. 16, 1990

[54] PROCESS FOR PRODUCING POROUS MATERIALS OF CARBON

[75] Inventors: Takamasa Kawakubo, Tano; Mitsuru Yoshida, Fujioka; Yoshihisa Suda, Maebashi, all of Japan

[73] Assignee: Mitsubishi Pencil Co., Ltd., Tokyo, Japan

[21] Appl. No.: 141,414

[22] Filed: Jan. 7, 1988

[51] Int. Cl.$^4$ ............................................. C01B 31/02
[52] U.S. Cl. .................................... 423/449; 423/445; 264/291
[58] Field of Search ............... 423/445, 449; 264/29.1, 264/29.5

[56] References Cited

U.S. PATENT DOCUMENTS

| Re. 29,101 | 1/1977 | Amagi et al. | 264/29.1 |
|---|---|---|---|
| Re. 32,319 | 12/1986 | Korb et al. | 423/445 |
| 3,258,363 | 6/1966 | Lieb | 264/29.1 |
| 3,574,548 | 4/1971 | Sands et al. | 264/29.1 |
| 3,639,953 | 2/1972 | Kimura et al. | 264/29.1 |
| 4,022,875 | 5/1977 | Vinton et al. | 264/29.1 |
| 4,412,675 | 11/1983 | Kawakubo | 423/449 |

FOREIGN PATENT DOCUMENTS

| 38-7005 | 1/1963 | Japan | 423/445 |
|---|---|---|---|
| 56-78409 | 6/1981 | Japan | 423/449 |
| 59-21512 | 2/1984 | Japan | 423/449 |
| 59-30708 | 2/1984 | Japan | 423/449 |
| 59-204671 | 12/1984 | Japan | 264/29.1 |

OTHER PUBLICATIONS

Knippenberg et al., "Carbon Foam", Philips Technical Review, vol. 36, No. 4, 1976, pp. 93 to 103.

Primary Examiner—John Doll
Assistant Examiner—Robert M. Kunemund
Attorney, Agent, or Firm—Oliff & Berridge

[57] ABSTRACT

Porous materials of carbon can be manufactured by introducing particles of organic polymer in a vessel of an arbitrary shape, dissolving a particle surface layer to produce point bondings between the particles, thereby producing porous materials of organic polymer, then insolubilizng or infusibilizing it, and further calcining the particles in inert gas atmosphere, thereby obtaining the porous materials of carbon fundamentally as sintered particle materials. Thus, this process permits, essentially without difficult means of managing complicated steps such as impregnating or extracting, facilitated manufacture of porous materials of carbon having a large quantity of continuous pores with ready adjustments of porosity and diameters of the pores and high strength.

9 Claims, No Drawings

PROCESS FOR PRODUCING POROUS MATERIALS OF CARBON

BACKGROUND OF THE INVENTION

The present invention relates to a process for producing porous materials of carbon and, more particularly, to a process permitting manufacture of porous materials having a large quantity of continuous pores, i.e., containing most of pores being continuous.

Heretofore, there is a process for producing porous materials of carbon having been produced by employing as a binder ground hollow materials of carbonaceous compound and calcining the material (disclosed in Japanese Patent Application Laid-open No. 19,999/1974). However, the porous materials produced by this process has such disadvantages that most of their pores are independent and a small quantity of pores are continuous and the porous materials accordingly have of lack of permeability. There is another process for obtaining porous materials of carbon having continuous pores, by impregnating reticulated polyurethane having continuous pores, from which thin partition walls of foamable polyurethane are removed with tetrahydrofuran solution of phenol resin, calcining the impregnated porous polyurethane permitting the reticulated polyurethane skeleton of base materials to become the skeleton of the carbide (disclosed in U.S. Pat. No. 3,922,334). According to this process, there are drawbacks that it is necessary to pay much attention to remove the excessive resin on the surface of the polyurethane after impregnating with the resin. In addition, the foamable polyurethane might be dissolved according to the selection of a solvent, and the foamable materials might sometimes be broken at the heating time, and this trend becomes remarkable as the polyurethane becomes softer. In order to obviate these drawbacks, there is another process for producing porous materials of carbon by impregnating in advance the foamable polyurethane with liquid epoxy resin or aqueous polyvinyl alcohol solution before impregnating with the resin (disclosed in Japanese Patent Application Laid-open No. 70,207/1976). However, the steps of this process are complicated. Since the foamable polyurethane originally has independent pores, it is necessary to obtain a reticulated structure having continuous pores to remove in advance the partition membranes of the pores or to similarly impregnate with the resin. In the latter case, there is a process for obtaining porous materials of carbon having continuous pores by introducing combustible gas into a foamable thermosetting resin produced by reacting polyisocyanate with phenol resin, furan resin or a mixture thereof with its pretreated substance, igniting the combustible gas to break the partition membrane and then carbonizing and calcining the materials (disclosed in Japanese Patent Application Laid-open No. 125,289/1978). However, the steps of this process are very complicated, and it is further difficult in this process to control the diameter of the pores. There is disclosed as a process for manufacturing porous materials of carbon having large continuous porosity including even diameter distribution of pores a process for producing porous materials of carbon formed at least partly of glassy carbon by mixing polyvinyl alcohol, phenol resin, hardening agent, starch and aqueous soluble salts, crosslinking and molding the mixture, solidifying the mixture, then extracting aqueous soluble substance by water to calcine phenol polyvinyl acetal synthetic resin imparted with continuous pores thereto, and producing porous materials of carbon formed at least partly of glassy carbon (disclosed in Japanese Patent Application Laid-open No. 51,109/1982). Further, there is disclosed another process for producing porous materials of carbon having continuous pores formed at least part of glassy carbon by impregnating porous materials of polyvinyl acetal having continuous pores containing inorganic materials or organic material to be carbonized with phenol or furan resin to be transformed into glassy carbon and then calcining the impregnated material (disclosed in Japanese Patent Application Laid-open No. 51,110/1982). However, the process should employ complicated steps such as premixing starch or aqueous soluble substance such as aqueous soluble salts with the polyvinyl acetal similarly to the previous process before preparing continuous pores, crosslinking and molding the substance, and then extracting the substance. Further, this process has drawbacks that the complete removal of the starch or aqueous soluble salts from the polyvinyl acetal molding is extremely difficult.

SUMMARY OF THE INVENTION

Accordingly, an object of the present invention is to provide an improved process for producing porous materials of carbon permitting, facilitated manufacture of porous materials of carbon having a large quantity of continuous pores with ready adjustments of porosity and diameters of the pores and high strength.

To achieve the foregoing object of the present invention, the inventors have undertaken a study to develop porous materials of carbon having the features as described above by introducing particles of organic polymer in vessel of an arbitrary shape, dissolving a particle surface layer to produce point bondings between the particles, thereby producing porous materials of organic polymer, then insolubilizing or infusibilizing it, and further calcining the particles in inert gas atmosphere, thereby obtaining the porous materials of carbon fundamentally as sintered particle materials and the study has revealed the present invention.

In the process of the present invention, the particles of organic polymer are softened by utilizing a fusibilization by heating or an insolubilization by a solvent to produce point bondings between the surfaces of the particles, and porous materials of organic polymer are thus formed. Then, the porous materials of organic polymer are insolubilized or infusibilized, and carbonized to allow the skeleton of the porous materials of organic polymer to remain, thereby obtaining the porous material of carbon.

The particles of the organic polymer in the process of the present invention are dispensable to first enable to form porous materials of organic polymer and to then allow the porous materials to be carbonized by calcining. Such particles of organic polymer comprise one or more of particles of thermoplastic resin such as chlorinated vinyl chloride resin, polyacrylonitrile resin, polyvinyl alcohol, polyphenylene ether, polyamideimide, polydivinylbenzene; particles pulverized by a crusher or ball mills from the previous stage of complete three-dimensional crosslinking of monomer or precondensate, i.e., cured monomer or precondensate to the degree of thermally deformable state such as furan resin, phenol resin, bismaleimidotriazine resin; particles of natural polymer having condensed polynuclear aromatic compounds in the fundamental structure of molecules such as tragacanth gum, Arabian gum, saccharides; the particles of synthetic polymer having condensed polynuclear aromatic compounds such as formalin condensate of naphthalenesulfonic acid, indanthrene dye and its intermediates in the fundamental structure of the molecules not contained in the previous compounds; and particles pulverized of dry distilled pitch heat treated at 300° to 500° C. and low molecular compounds contained therein removed by a solvent such as petroleum asphalt, coal tar pitch, synthetic resin.

The particles of the organic polymers in the process of the present invention do not include particles of completely cured thermosetting resin pulverized, insolubilized and infusibilized so that the particles are not solubly bonded such as furan resin, phenol resin. Resins such as polyethylene, acrylic resin, and polyoxymethylene cannot obtain porous materials of carbon durable for use by carbonization or cannot retain the carbon, and are not included in the particles of organic polymer in the process of the present invention.

The shape of the particles of the organic polymer used in the process of the invention is not particularly limited. The size of the particles of the organic polymer preferably comprises 5 mm or less in diameter or in the maximum side, so that 90% or more of the particles should preferably include 50 microns or larger in diameter or in the maximum side. When the particles having the diameter or maximum side larger than 5 mm are used, the particles carbonized to form the porous materials of carbon tend disadvantageously to crack, to induce a decrease in the strength of the porous materials of carbon, or to displace in the porosity or in the diameter of the pores from the initially set values. When the particles having diameter or maximum side less than 50 microns exceed 20%, the porous materials of carbon after calcined disadvantageously become excessively dense. In order to increase the diameter of the pores of the porous materials of carbon, resin particles having larger diameter may be used, and in order to, on the contrary, decrease the diameter of the pores of the porous material, resin particles having smaller diameter may be employed. In order to equalize the larger diameter of the pores, the organic polymer particles are classified in advance by a screen or by blowing, and the diameters of the particles are thus equalized. In order to, on the other hand, unequalize the diameters of the pores, a resin having particles of various diameters of large distribution may be employed.

When the organic polymer particles are introduced into the vessel, in addition to the deposition of the particles by natural drop, a vibrator may be used or pressure may be applied or both may be employed as required for the purpose of increasing the strength of the porous materials of carbon or reducing the porosity.

Then, the organic polymer particles are heated by a heating oven while introduced into the vessel, and porous materials of the organic polymer having continuous porosity are formed. The heating temperature can range from at least the softening point of the organic polymer particles employed to their melting point and is adjusted so that the surface layers are point bonded among the particles. When the temperature is excessively low, the fluidity of the particles due to softening becomes excessively low, thereby causing no point bonding among the particles. When the temperature is excessively high, the fluidity of the particles due to softening becomes high, thereby disadvantageously causing the porous materials of the organic polymer thus produced to close the pore or further causing the pores themselves to be erased.

The particles of the organic polymer may be evenly coated with a solvent for solubilizing the particles of the organic polymer using a high speed mixer, such as a Henschel mixer, at 10 wt.% or less, preferably 5 wt.% or less of the solvent to the particles of the organic polymer according to the degree of the solubility. The solvent coated particles, are introduced by the similar method in the vessel. The quantity of the solvent to be added may be that required to form porous materials of the organic polymer having continuous porosity in such a manner that only the surface layers of the particles of the organic polymer are solubilized. When the quantity of the solvent is excessively large, the degree of softening of the particles of the organic polymer becomes excessively large, and the resultant fluidity becomes excessive, thereby disadvantageously causing the pores of the porous materials of the organic polymer to be closed, or to be vanished. The porous particles of the organic polymer containing the solvent thus introduced into the vessel are allowed to stand, or are pressurized, or heated, or both pressurized and heated, as required, thereby forming the porous materials of the solvent-containing porous materials of the organic polymer having continuous porosity. Thereafter, the solvent is volatilized from the porous materials by a vacuum drying machine, a heating drying machine or by natural release, thereby obtaining the porous materials of the organic polymer.

Then, the porous materials of the organic polymer are insolubilized or infusibilized by any of the above-described methods. The insolubilizing or infusibilizing method comprises may be selected from the group consisting of heat treating at 50° to 300° C. in an oxidation atmosphere such as air or ozone, heating at 50° to 300° C. in a corrosive gas atmosphere such as ammonia gas or chlorine gas, dipping in strong acid such as concentrated sulfuric acid, and exposure to an emitting radiation beam. The insolubilizing or infusibilizing method is selected based on the properties of the particles of the organic polymer employed so that the porous materials of carbon having a great quantity of continuous pores and high strength can be produced. and is not particularly limited.

The porous materials of the organic polymer thus insolubilized or infusibilized are then heated at 400° C. or higher, preferably 700° C. or higher in inert gas atmosphere such as nitrogen or argon, and carbonized. The calcining temperature is not limited to or particular upper limit, and may be approx. 3,000° C. as required.

The porous materials of carbon thus obtained according to the process of the present invention contain mostly continuous, pores and porosity and the diameter of the pores are readily adjustable. The skeleton produced by rigidly fusion-bonding or soluble-bonding among the particles of the organic polymer is the carbide of the organic polymer and accordingly has high strength. Since the porous materials of carbon do not almost contain idle pores, the porosity can be readily measured, and the porous materials of carbon has an advantage of large thermal impact resistance. Thus, the porous materials of carbon produced according to the process of the present invention are useful for various filters, catalyst carriers, light-weight structural materials, heat insulators, electrodes, chemical adsorbers, panel heaters and radio wave shielding materials.

EXAMPLE 1

Chlorinated vinyl chloride resin powder having 67% of carbon content and 740 of polymerization (Nikatemp T-870 produced by Nippon Carbide Industries Co., Ltd., Japan) was pulverized by a vibration screen into particles having diameters of the range from 48 mesh (297 microns) to 100 mesh (149 microns). Then, the particles were introduced by a vibrator into a graphite box having 100 mm (longitudinal size), 10 mm (lateral size) and 10 mm (depth) of inner dimensions.

The particles were allowed to stand in a heating oven at 180° C. for 20 hours to form the porous materials of the chlorinated vinyl chloride, and were then insolubilized and infusibilized.

Then, the particles were calcined at 10° C./hr of temperature rising velocity from a room temperature to 300° C., at 30° C./hr from 300° C. to 500° C. and at 200° C./hr from 500° C. to 1,000° C. in nitrogen gas atmosphere, then cooled, and the porous materials of carbon thus produced was removed. The various properties of the porous material of carbon thus produced are listed in Table 1.

EXAMPLE 2

Chlorinated vinyl chloride resin powder having 65% of carbon content and 650 of polymerization (Nikatemp T-025 produced by Nippon Carbide Industries Co., Ltd., Japan) was molded in a single shaft screw type molding machine so that the section became a circle having a diameter of 1.5 mm to obtain a linear material. Then, this material was cut by a pelletizer, thereby obtaining a cylindrical pellet having a diameter of 1.5 mm and a height of 1.5 mm. This pellet was then introduced into a graphite box having 200 mm (longitudinal size), 20 mm (lateral size) and 20 mm (depth), and the pellet was pressed by a hydraulic press at 50 kg/cm² for 1 minutes. Then, the particles were retained at 150° C. for 10 hours, then at 180° C. for 3 hours to form the porous materials of the chlorinated vinyl chloride, then at 180° C. for 20 hours, and insolubilized and infusibilized. Then, the pellet was calined at 5° C./hr of temperature rising velocity from room temperature to 300° C., at 10° C./hr from 300° C. to 500° C., and at 100° C./hr from 500° C. to 1,000° C. in nitrogen gas atmosphere, cooled, and the porous material of carbon thus produced was then removed. The various properties of the porous materials of carbon are listed in Table 1.

EXAMPLE 3

The particles of pulverized tragacanth gum powder having diameters of from 32 mesh (500 microns) to 200 mesh (74 microns) were removed by a vibration type screen. Then, the particles were evenly dispersed and mixed with 5 wt.% of water in a Henschel mixer, the wet powder was introduced by a vibrator in a graphite box having 100 mm (longitudinal size), 10 mm (laterial size), and 10 mm (depth) of inner volume, and was pressed by a hydraulic press at 50 kg/cm² for 1 minutes. Then, the particles were heated at 110° C. for 3 hours to evaporate and dissipate the water, thereby obtaining the porous materials of tragacanth gum. Then, the porous materials were further heated by a heating oven at 180° C. for 20 hours to insolubilize and infusibilize the porous materials, calcined at 30° C./hr of temperature rising velocity from room temperature to 500° C., at 200° C. from 500° C. to 1,000° C. in the nitrogen gas atmosphere, cooled, and the porous materials of carbon were then removed. The various properties of the obtained porous materials of carbon are listed in Table 1.

EXAMPLE 4

A sheet-shaped composition having a softening point of 150° C. by crosslinking was obtained by three rolls heated and added with a hardening agent to a precondensate of furan (Hitafuran VP-302 produced by Hitachi Chemical Co., Ltd., Japan). Then, the composition was cooled, pulverized by a crusher, and particles having diameters of 0.1 mm to 1.0 mm were removed by a vibration type screen. The composition was then introduced into a graphite box having 200 mm (longitudinal size), 20 mm (lateral size) and 20 mm (depth), and the pellet was pressed by a hydraulic press at 50 kg/cm² for 1 minutes. Then, the composition was retained in a heating oven at 150° C. for 10 hours, thereby obtaining porous materials of the furan resin, then at 200° C., and insolubilized and infusibilized. Then, the porous materials were calcined at 30° C./hr of temperature rising velocity from room temperature to 500° C., and at 200° C./hr from 500° C. to 1,000° C. in nitrogen gas atmosphere, cooled, and the porous materials of carbon thus produced was then obtained. The various properties of the porous materials of carbon are listed in Table 1.

TABLE 1

|  | Example 1 | Example 2 | Example 3 | Example 4 |
| --- | --- | --- | --- | --- |
| Size Lon. | 70 mm | 155 mm | 75 mm | 160 mm |
| Lat. | 6 mm | 14 mm | 6.5 mm | 15 mm |
| Hei. | 6 mm | 14 mm | 6.5 mm | 15 mm |
| Bulk density | 0.70 | 0.50 | 0.60 | 0.75 |
| Continuous porosity | 89% | 92% | 90% | 89% |
| Bending strength | 2.5 kg/mm² | 1.3 kg/mm² | 2.0 kg/mm² | 2.7 kg/mm² |

What is claimed is:

1. A process for producing porous materials of carbon, comprising:
   introducing particles of an organic polymer in a vessel of an arbitrary shape, and
   dissolving a particle surface layer to produce point bondings between the particles, thereby producing a porous organic polymer having continuous pores,
   then insolubilizing or infusibilizing said porous organic polymer, and
   further calcining said porous organic polymer in an inert gas atmosphere.

2. The process according to claim 1, wherein the diameter or maximum side of the particle of the organic polymer is 5 mm or less, and 90% or more of the particles has diameter or maximum side having 50 microns or larger.

3. The process according to claim 1 or 2, wherein the particles of organic polymer comprise one or more of the particles of thermoplastic resin such as chlorinated vinyl chloride resin, polyacrylonitrile resin, polyvinyl alcohol, polyphenylene ether, polyamideimide, polydivinylbenzene; the particles pulverized by a crusher or ball mills from the previous stage of complete three-dimensional crosslinking of monomer or precondensate, i.e., cured monomer or precondensate to the degree of thermally deformable state such as furan resin, phenol resin, bismaleimidotraizine resin; the particles of natural polymer having condensed polynuclear aromatic compounds in the fundamental structure of molecules such as tragacanth gum, Arabian gum, saccharides; the particles of synthetic polymer having condensed polynuclear aromatic compounds such as formalin condensate of naphthalenesulfonic acid, indanthrene dye and its intermediates in the fundamental structure of the molecules not contained in the previous compounds; and the particles pulverized of dry distilled pitch heat treated at 300° to 500° C. and low molecular compounds contained therein removed by a solvent such as petroleum asphalt, coal tar pitch, synthetic resin.

4. The process according to claim 1, wherein the porous organic polymer is bonded among its particles by fusibilizing the surface layers of the particles by heating or by solubilizing using a solvent and point bonding the particles.

5. The process according to claim 1, wherein the porous organic polymer is insolubilized.

6. The process according to claim 1, wherein the calcining is carried out by heating at 400° C. or higher.

7. The process according to claim 1, wherein the porous organic polymer comprises 5% or higher of residual carbon yield of the polymer substance.

8. The process of claim 1 wherein said particles of organic polymer comprise particles of chlorinated vinyl chloride resin.

9. The process of claim 5, wherein said porous organic polymer is infusibilized.

* * * * *